United States Patent [19]
Leksell et al.

[11] Patent Number: 5,325,207
[45] Date of Patent: Jun. 28, 1994

[54] FACSIMILE MACHINE USING THIN FILM ELECTROLUMINESCENT DEVICE FOR SPOT SCANNING

[75] Inventors: David Leksell, Oakmont; Juris A. Asars, Murrysville Boro; Zoltan K. Kun, Churchill Borough, all of Pa.

[73] Assignee: Westinghouse Electric Corp., Pittsburgh, Pa.

[21] Appl. No.: 693,258

[22] Filed: Apr. 29, 1991

[51] Int. Cl.[5] .................... H04N 1/028; H04N 1/036; H04N 1/29; G01D 15/14
[52] U.S. Cl. ................... 358/296; 358/300; 346/107 R; 346/160
[58] Field of Search ............... 358/296, 300; 346/107 R, 108, 160, 154

[56] References Cited
U.S. PATENT DOCUMENTS

| | | | |
|---|---|---|---|
| 4,535,341 | 8/1985 | Kun et al. | 346/107 R |
| 4,672,219 | 6/1987 | Iwabuchi et al. | |
| 4,734,723 | 3/1988 | Ishitobi | 346/160 |
| 4,807,047 | 2/1989 | Sato et al. | 358/300 |
| 4,827,350 | 5/1989 | Kobayashi et al. | |
| 4,899,184 | 2/1990 | Leksell et al. | 346/160 X |
| 5,025,321 | 6/1991 | Leksell et al. | 358/296 |

FOREIGN PATENT DOCUMENTS

| | | | |
|---|---|---|---|
| 0045252 | 2/1982 | European Pat. Off. | H04N 1/18 |
| 0348003 | 12/1989 | European Pat. Off. | H04N 1/18 |

*Primary Examiner*—Benjamin R. Fuller
*Assistant Examiner*—Eric Frahm
*Attorney, Agent, or Firm*—R. P. Lenart

[57] ABSTRACT

An improved facsimile machine having at least one edge emitting thin film electroluminescent line array, each array having a plurality of pixels wherein the pixels are selectively activated. A light beam from each pixel is directed to a known point along a line on a document and reflects to a sensor. The reflected beam corresponds to a grey level at the point of reflection on the document and causes the sensor to generate a signal corresponding to that greyness level. Sufficient pixels are provided to generate sufficient light beams to strike all points along a line across a document.

18 Claims, 3 Drawing Sheets

FACSIMILE MACHINE USING THIN FILM ELECTROLUMINESCENT DEVICE FOR SPOT SCANNING

BACKGROUND OF THE INVENTION

The invention relates to a facsimile machine in which a document is scanned and the image of the document is converted into an electrical signal which is representative of the image. This electrical signal can then be stored, transmitted via telephone or radio wave, or processed in another manner. In a second or write mode the facsimile machine receives an electrical signal, such as for instance from a telephone line, and converts the electrical signal into a fixed copy of the image represented by such electrical signal. Such facsimile, or fax, machines typically output the copy on a medium such as paper. Typically, prior art designs used separate mechanisms for the read mode in which a light source is directed upon the document and a signal is produced by the reflected light from the document as it is detected by a photoelectric detector which typically would be a photoelectric cell or similar sensor. Separate apparatus within the machine is used when an image signal is received by the fax machine to convert that image signal into an actual fixed copy. Such conversion has been done using thermal paper and photographic means. More recently fax machines have used a scanning laser head to place a photo image on a photo receptor device such as an electro-static drum copier. Such laser heads are relatively large and expensive, and in many instances require complicated scanning mirrors. Both thermal printing heads and scanned laser printing heads are slow and often require that the signal to be processed must be stored as it is received from a transmission line.

Thin film electroluminescent line array emitters and printers using such are known. An example of this type of application is disclosed in U.S. Pat. No. 4,535,341 to Kun et al. U.S. Pat. No. 4,535,341 is incorporated herein by reference. Other examples of thin film electroluminescent devices being used in printers are shown in U S Pat. Nos. 4,734,723 and 4,807,047.

In our co-pending United States patent application Ser. No. 527,213 which issued as U.S. Pat. No. 5,025,321 on Jun. 18, 1991 we disclose a facsimile machine which uses a thin film electroluminescent device to provide the photo-imaging source to a photoreceptor in the write mode, and also to provide the source for illuminating the paper when a scanning sensor is used in the reading mode. In that disclosure we teach that the electroluminescent device should be pivoted to cause the emitted light to travel across the page and then reflect to a sensor containing an array of photo cells containing as many as 2500 individual photo cells. Such large arrays are expensive.

SUMMARY OF THE INVENTION

We provide a thin film electroluminescent line array structure having edge emitting pixels positioned in a facsimile machine so as to selectively direct light emitted from selected pixels to illuminate and reflect from known points on a line across a platen over which a document passes. The nature of that reflected beam will correspond to a grey level of the point from which it was reflected. The light beam reflects to a sensor element. That sensor generates a signal corresponding to the grey level of the point from which it was reflected. Thus, we rely upon the sensor only to determine grey level, not to identify locations. As the document is moved across the platen, the process is repeated until sufficient lines have been scanned to cover the entire document. Our system requires only a single photo cell or small array of photo cells as a photo sensor. We prefer to provide at least two sensors each positioned to receive reflected beams from a portion of the pixels. Such an arrangement allows us to activate an equal number of pixels simultaneously as the beam from each reflects to a different sensor. Simultaneous activation will reduce scan time and improve signal to noise ratio in the device.

BRIEF DESCRIPTION OF THE DRAWINGS

The features and advantages of the invention will become apparent from consideration of the description in connection with the accompanying figures in which.

DESCRIPTION OF FIGURES AND EMBODIMENTS

The invention is directed to the use of a thin film electroluminescent device which acts as a high resolution electronic controlled light source for photo-imaging and as a light source for a scanning sensor in a facsimile machine.

Figure 1:
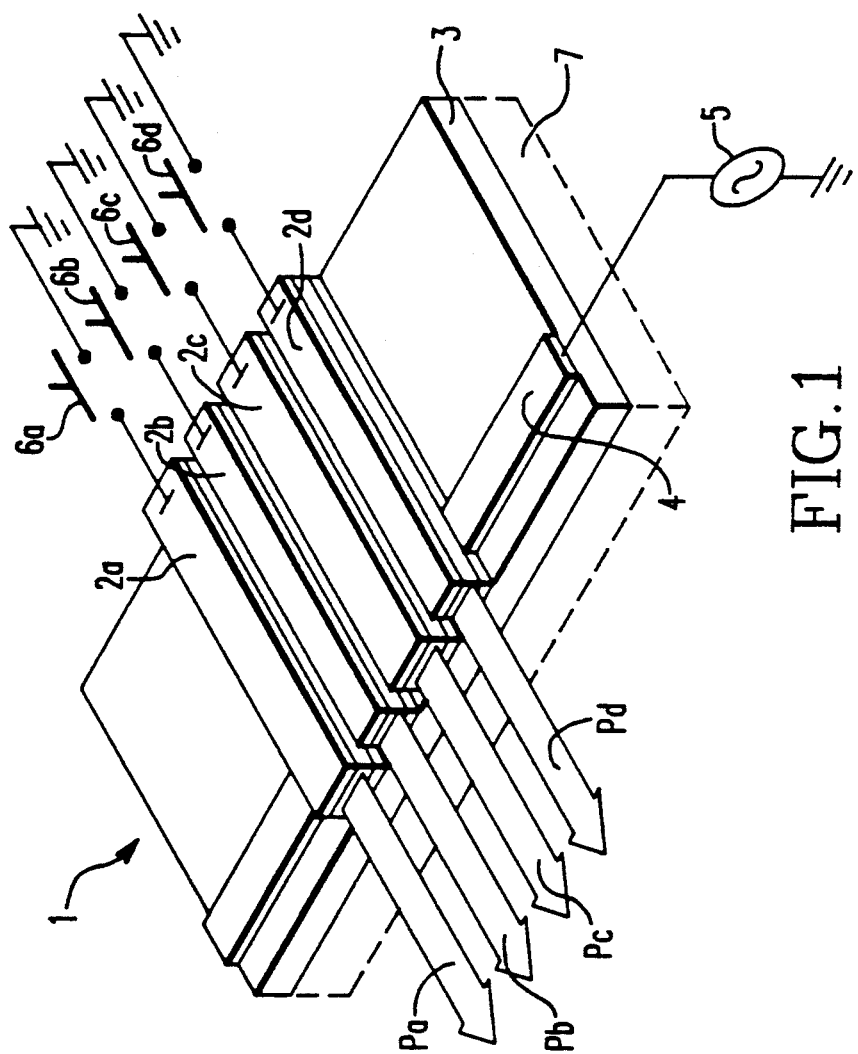
FIG. 1 is a diagrammatic illustration shown in partial cross section of a thin film electroluminescent line array showing four adjacent pixels.

Thin film electroluminescent devices are well suited to use in forming a line array of pixels, each emitting a controlled beam of light at the edge of the device. The edge emitted light is of high intensity and provides very good resolution in imaging systems. A typical array for use in a facsimile machine is shown in FIG. 1. The array 1 shown has four pixels, 2a, 2b, 2c and 2d. It is to be understood that in an actual facsimile machine using the invention the pixel array device would be composed of hundreds or thousands of similarly arranged pixels. The pixels are formed on a substrate material 3 having a common electrode 4 which is electrically connected to an excitation source 5. The upper surface of each respective pixel contains a pixel electrode which is connected to a controlling electrical signal through a signal switching device such as represented at 6a, 6b, 6c and 6d. When a signal provided to the pixel electrode by means of switch device 6a through 6d, a respective primary light beam $P_a$, $P_b$, $P_c$, $P_d$ is caused to emit from the edge of the respective pixel. Switches 6a through 6d are diagrammatic in nature and in the actual facsimile machine electronic switching circuitry would be used to generate respective pixel signals. As shown in more detail in FIGS. 2 and 3, the emitted beam is reflected to a sensor 7. That sensor 7 may also be mounted to substrate 3 as indicated in FIG. 1 by dotted lines.

Figure 2:
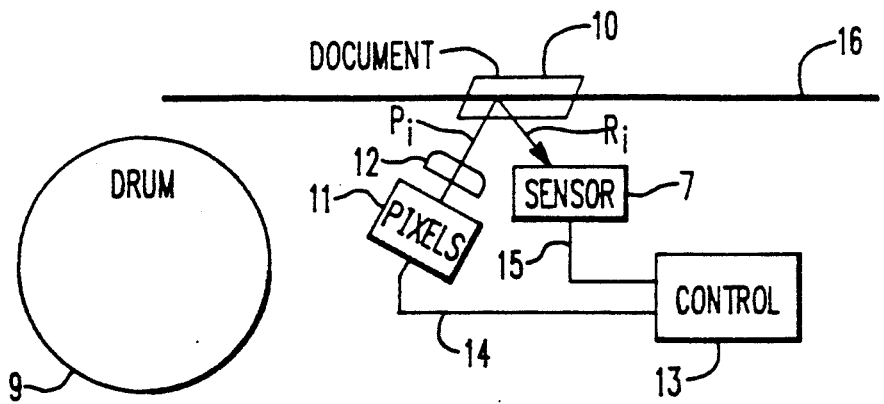
FIG. 2 is a diagrammatic illustration of a presently preferred embodiment using a pixel array which is shown in a read mode position.

FIG. 2 shows the apparatus of a facsimile machine in the read mode. In the read mode it is desired to convert the image on an original document into electrical signals representative of that image for transmission, storage, or for later generation into a copy. In FIG. 2 the drum 9 for the write mode is shown but is not operating. The pixel heads 11 and associated lens 12 have been directed toward a document 16. The document moves across a platen 10. Control 13 supplies via cable 14 signals to provide a source of illuminating light from the pixel heads 11 activated in a predetermined sequence. The light beams $P_i$ pass through platen 10 and reflect from the document 16 moving across the platen 10. The reflected beams $R_i$ strike at least one sensor 7. The sensor 7 is a photosensitive device, such as a photocell, which generates a signal representative of the reflected light beam $R_i$ which corresponds to a grey level on the document. Sensor 7 could be either resistive or a semiconductor device which provides an output signal to cable 15. That signal is derived from the reflected beams and is representative of the grey level of points contained on the document. Control 13 can process the signal from the sensor 7 when the facsimile machine is in the read mode. A typical control process would be to transmit the signal to a memory, telephone or radio transmission output.

Figure 3:
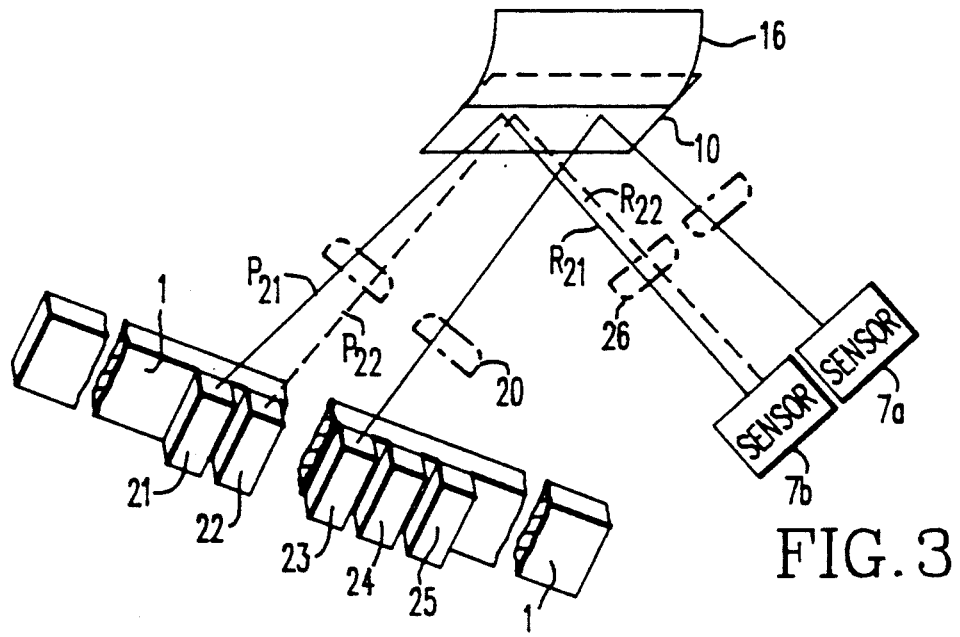
FIG. 3 is a diagrammatic illustration of a portion of the embodiment shown in FIG. 2 showing light being emitted from and reflected to a sensor.
Figure 4:
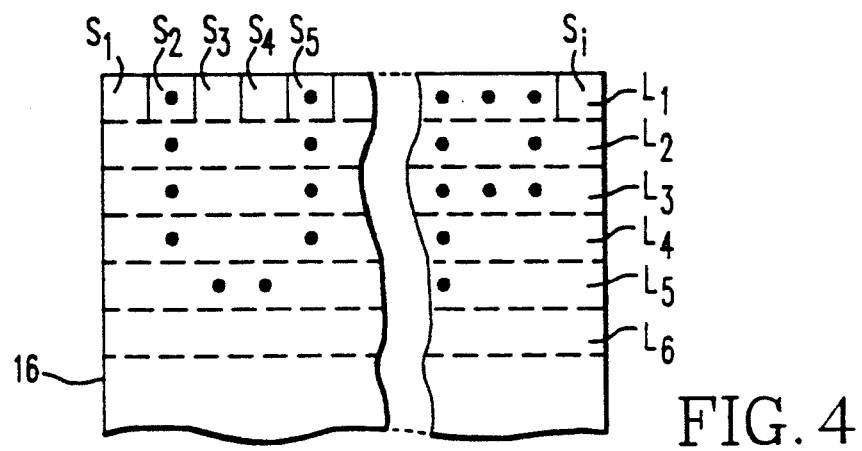
FIG. 4 is a segment of a scanned document showing how points are identified and read with our device.

The diagram of FIG. 3 is a simplified illustration of the operation of our device. We provide that at least one thin film electroluminescent unit 1 having a series of pixels typically well over 100. For illustration purposes we show five pixels 21, 22, 23, 24 and 25 from each of which a primary beam $P_i$ can be emitted in accordance with a predetermined sequence. The electroluminescent unit 1 is shown as being broken in several sections to indicate that a very small portion of the unit is being shown. Additionally, in some applications more than one unit could be used. Thus, each segment could also be a part of a separate electroluminescent unit. Each beam passes through an optional lens 20 to and through platen 10. The beam strikes a document 16 passing over the platen at point along a line across the document. The beam is then reflected through a second optional lens 26 onto sensor 7. A lens system is not necessary if a single sensor is used or some type of baffling system is used in a multisensor approach. Every document can be considered to be comprised of a series of lines which can be broken into segments. For illustrative purposes in FIG. 4 we show a portion of document 16 having lines $L_1$ thru some $L_i$ depending upon the length of the paper. Within each line there are segments $S_1$ thru some $S_i$ corresponding to points on document 16 struck by the beams from pixels in the thin film electroluminescent device. The pixels are activated so that the beam from one pixel will strike and be reflected from a given point, the next pixel will strike and be reflected from an adjacent point, and so on across a line. For example the beam $P_{21}$ from pixel 21 may strike segment $S_1$ and be reflected as beam $R_{21}$. Then, the next pixel emits a beam $P_{22}$ which may strike the next segment $S_2$ and be reflected as beam $R_{22}$. These beams $P_{22}$ and $R_{22}$ are shown in dotted lines to indicate that they are emitted after beams $P_{21}$ and $R_{21}$. Reflected beams $R_{21}$ and $R_{22}$ will differ in quality depending upon the grey level of the point at which each beam strikes. Thus, the nature of the beam reflected from a white area such as segments $S_1$, $S_3$ and $S_4$ will be different from the beam reflected from a dark area as is present in segments $S_2$ and $S_5$. An entire line across paper 16 is scanned and then the paper is moved so that the next line across the paper could be scanned. It should be apparent that the scan time can be reduced if two or more pixels such as pixels 21 and 23 are activated simultaneously and reflected to different sensors 7a and 7b. Now half the line could be scanned using sensor 7a and the other half scanned using sensor 7b. Since we have controlled the emission of primary beams from the respective pixels to known points, the sensors 7a and 7b need only determine the character of the reflected beam as it corresponds to a grey level. Then, with a logic circuit 42 (FIG. 5) we can match the grey level of the reflected beam to the point on the paper from which it came.

Figure 5:
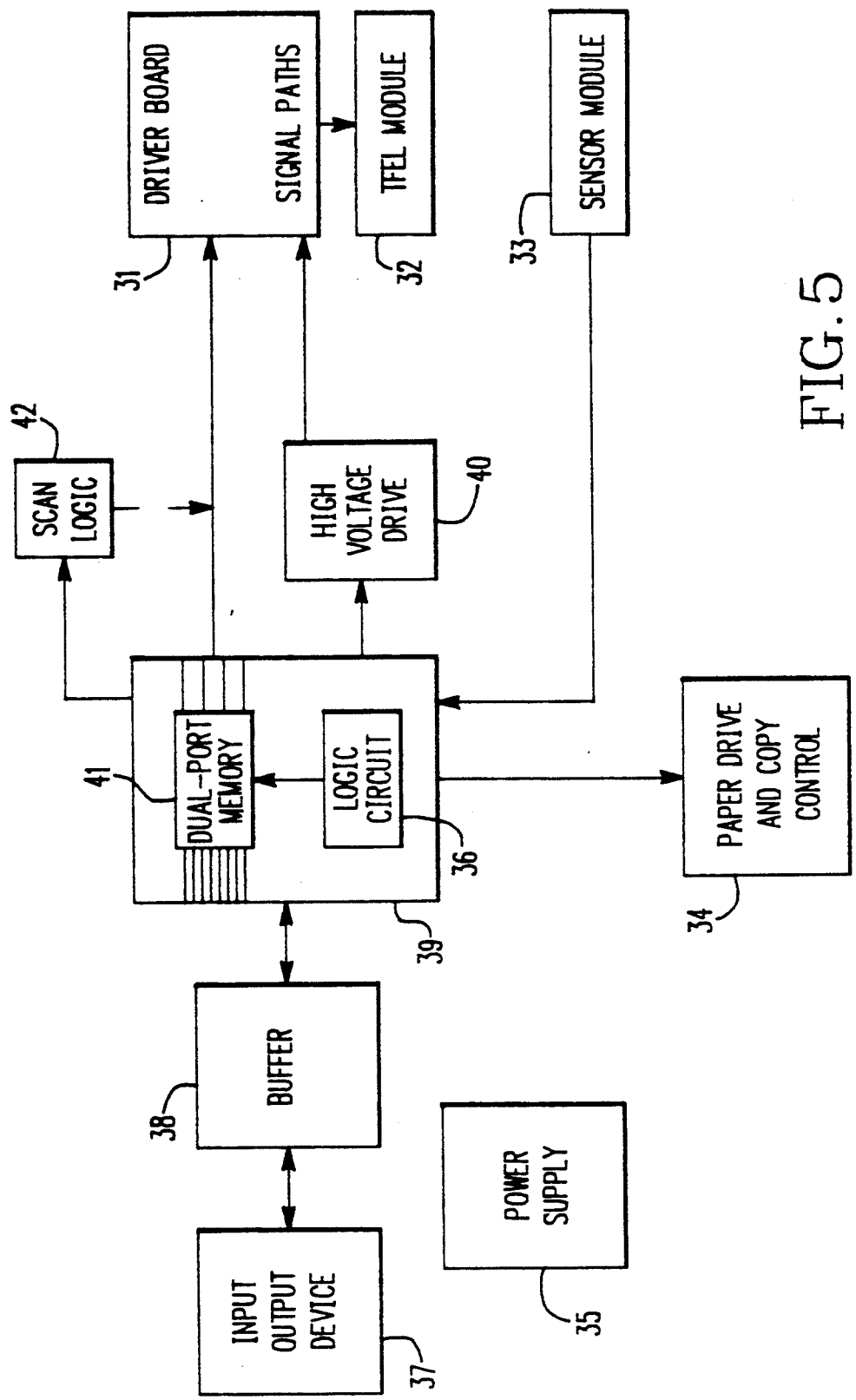
FIG. 5 is a block diagram showing a control scheme for operation of the embodiment of FIG. 2.

FIG. 5 shows a diagram of a present preferred embodiment of a control scheme having an input/output device 37 which could include a personal computer, telephone transmission interfaces, or other known devices. Signals from source 37 can be stored in buffer 38 when the speed of reception or transmission exceeds that of the read or write modes of the fax machines. Control circuit 39, containing logic circuit 36 and dual-port memory 41, controls both the sensor module 33 and the thin film electroluminescent (TFEL) module 32. High voltage drive 40 is used as an excitation source for the pixel array. Driver board 31 provides an interface for the signal path to the TFEL module 32. A general power supply source 35 is available for all control devices. In addition to the TFEL module 32 and the sensor module 33, other functions of the fax machine to control the copying and paper drive are provided for by the auxiliary control circuit 34.

The control scheme shown in FIG. 5 is used to selectively activate pixels in the array 1, as previously described. If two or more pixels are being activated simultaneously, signals will be coming simultaneously from an equal number of sensors. In that event a scan logic unit 42 provides the signal for the driver board 31 to scan the light emitting pixels and a dual port memory 41 can receive the sensor signals and consolidate them for transmission. For example, if two sets of pixels and associated sensors are used to scan one line of a document, the signals for the first half of the line must be combined with the signals from the second half of the line. Only then can each full line of the document be transmitted in sequence. Such a combined signal can be utilized any receiver for printing. Of course, if the receiver has a comparable dual print system for each line of text, it may not be necessary to combine the signals from the sensors on a line by line basis. The control scheme may also be used for many other purposes, including security of transmission, and to shorten signals by deleting unwanted areas of scan during the read mode.

Based on the foregoing description of the invention other different embodiments of the present invention may be constructed without departing from the spirit and scope of the present invention.

What is claimed is:

1. An improved facsimile machine wherein a document passes over a platen and electrical signals are produced which are representative of the document wherein the improvement comprises:

at least one edge emitting thin film electroluminescent line array, said array containing a plurality of pixels which can be selectively activated to produce light beams, the array positioned so that a light beam from each of said pixels can be directed to a known point on the platen and reflected from a corresponding known point on a document placed on the platen to at least one sensor, said at least one array having sufficient pixels to direct beams to points forming a line across the platen;

said at least one sensor maintained at a fixed position relative to the platen for receiving said light beam reflected from the document and producing electrical signals corresponding to greyness levels at points from which the light beam was reflected; and control means connected to said at least one array for selectively activating the pixels to emit light beams such that each of said light beams reflects from the document to said at least one sensor.

2. The improved facsimile machine of claim 1 also comprising optical lens means for focusing light beams emitted from the pixels.

3. The improved facsimile machine of claim 2 wherein the optical lens means is comprised of a plurality of lens each lens sized and positioned to focus light emitted from a group of pixels.

4. The improved facsimile machine of claim 3 wherein at least one lens is attached to at least one edge emitting thin film electroluminescent line array, 5. The improved facsimile machine of claim 1 also comprising optical lens means for focusing reflected light beams.

6. The improved facsimile machine of claim 1 wherein at least one sensor is at least one photo cell.

7. The improved facsimile machine of claim 1 wherein the sensor is an array of photo cells, 8. The improved facsimile machine of claim 1 also comprising a multiple port memory and wherein said at least one sensor is a plurality of photo cells each cell being connected to a separate port of the multiple port memory.

9. The improved facsimile machine of claim 8 having two sensors wherein the multiple port memory is a dual port memory.

10. The improved facsimile machine of claim 8 also comprising scan logic means to generate signals for the electroluminescent array to produce at least one segmental light beam.

11. The improved facsimile machine of claim 1 wherein at least one sensor is attached to at least one edge emitting thin film electroluminescent line array.

12. An improved facsimile machine wherein a document passes over a platen and electrical signals are produced which are representative of an image on the document wherein the improvement comprises:

at least one edge emitting thin film electroluminescent line array of pixels having a plurality of groups of pixels which can be selectively activated to produce light beams and wherein one pixel from each group can be simultaneously activated, the array of pixels positioned so that a light beam from each pixel can be directed to a known point on a document placed on the platen and any selected point on the document can be illuminated by a light beam from one pixel, the at least one array having sufficient pixels to direct beams to points forming a line across the document;

a plurality of sensors, each sensor positioned to receive light beams emitted from only those pixels within a group of pixels associated with said each sensor, said each sensor producing electrical signals corresponding to greyness levels at points on the document from which light beams were reflected to said each sensor; and control means connected to the array of pixels for selectively activating the groups of pixels to emit light beams which are reflected from the document to an associated sensor.

13. The improved facsimile machine of claim 12 wherein at least two pixels, each pixel from a different group of pixels, are simultaneously activated.

14. The improved facsimile machine of claim 12 also comprising at least one optical lens positioned to focus at least one light beam emitted from a pixel.

15. The improved facsimile machine of claim 14 wherein the at least one optical lens is comprised of a plurality of lenses, each lens positioned to focus light from only one group of pixels.

16. The improved facsimile machine of claim 12 also comprising at least one optical lens positioned to focus at least one light beam reflected from the document.

17. The improved facsimile machine of claim 16 wherein the at least one optical lens is comprised of a plurality of lenses, each lens positioned to focus light beams reflected to a single sensor.

18. The improved facsimile machine of claim 12 also comprising a logic circuit contained in the control means and connected to the sensors for matching the electrical signals from the sensors with points on the document.

* * * * *